Dec. 9, 1969 D. F. GRAF 3,483,322

NOISE CUT-OFF SYNC-SEPARATOR

Filed Feb. 9, 1966

INVENTOR
David F. Graf

BY Hofgren, Wegner, Allen, Stellman & McCord
ATTORNEYS 3,483,322
Patented Dec. 9, 1969

3,483,322

NOISE CUT-OFF SYNC-SEPARATOR

David F. Graf, Morton Grove, Ill., assignor to Warwick Electronics Inc., a corporation of Delaware Filed Feb. 9, 1966, Ser. No. 526,134
Int. Cl. H04l 7/00; H04n 5/00
U.S. Cl. 178—69.5 6 Claims

ABSTRACT OF THE DISCLOSURE

A sync-separator noise cut-off circuit having a transistor which disables the sync-separator when a demodulated composite signal with a noise pulse exceeds a DC signal proportional to an average value of the demodulated composite signal. The transistor is shunted by a finite impedance, and is coupled to a potential source which rapidly charges the interelectrode capacitance of the transistor when the transistor is driven into nonconduction by a noise pulse, to eliminate high frequency noise.

Figure 1:
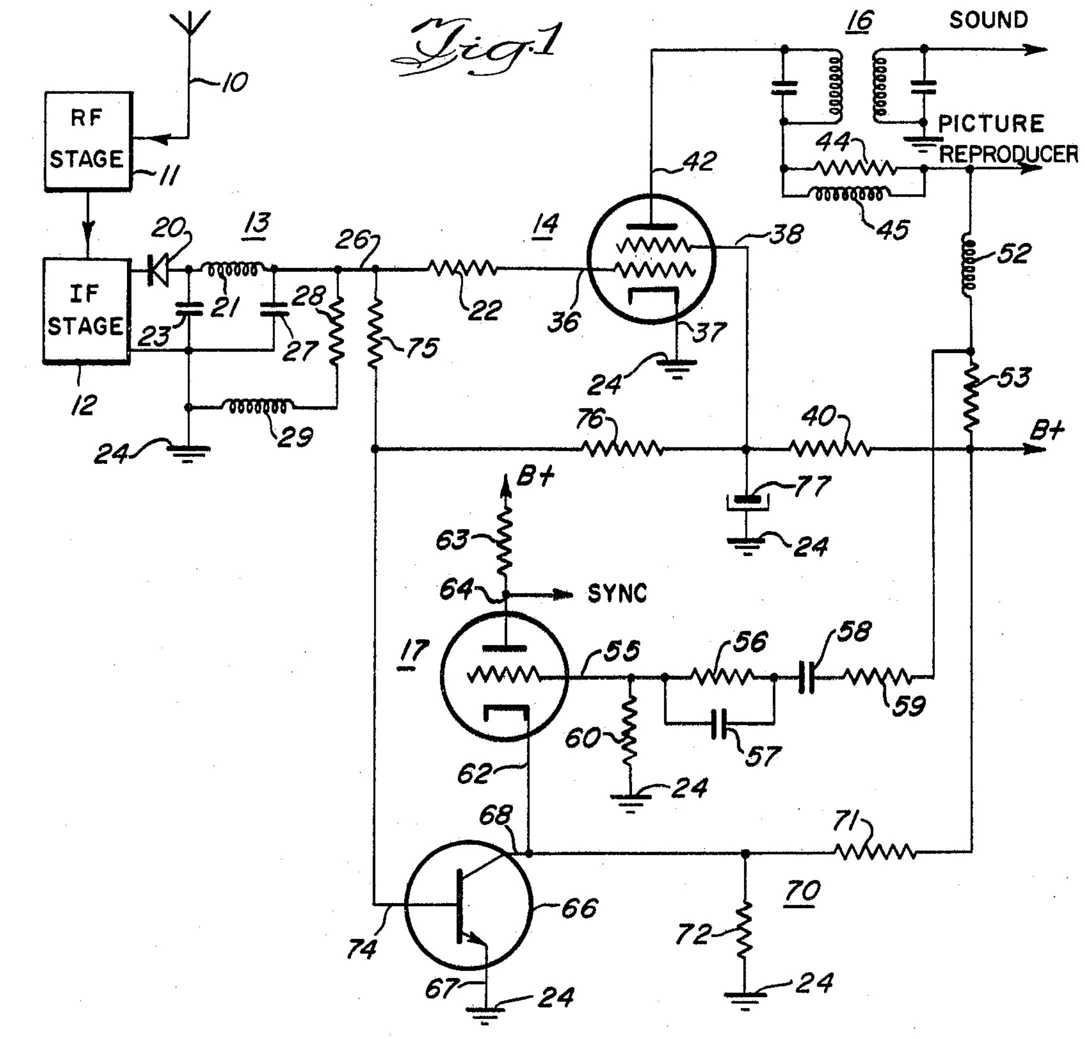

This invention relates to a noise cut-off circuit for a synchronizing signal separator in a television signal receiver, and more particularly to a noise gate using a transistor.

Various noise gating circuits are known for preventing large amplitude noise impulses from deleteriously affecting the output of a sync separator in a television signal receiver. However, the various features which are necessary to provide a simple and effective noise cut-off circuit have not been successfully incorporated in such prior circuits.

For example, Kroger Patent 2,880,271, illustrates one type of noise cut-off circuit for a sync separator. A unidirectional potential, which varies in accordane with the intensity of the received television signal, establishes a threshold for a noise gating triode connected to the cathode of a sync separator. The detected composite television signals are impressed on the control electrode of the noise triode, causing noise bursts which exceed a predetermined amplitude to disable the sync separator.

The Kroger circuit suffers from several disadvantages which prevent its use in commercial television receivers. The normally conducting noise triode has a relatively high impedance to ground, as on the order of several hundred ohms. This resistance, which is in the cathode of the triode sync separator is reflected as a resistance of substantially greater magnitude in the control grid circuit of the sync separator. A reflected resistance of this magnitude deleteriously affects the bias for the sync separator, causing the triode to stop operating as a switch and allowing a part of the upper portion of the video signal to pass to the output circuit of the sync separator.

A typical television receiver develops a low amplitude detected composite video signal which may be on the order of three volts. Due to the large effective grid resistance, the Kroger sync separator must be driven with a large amplitude detected composite video signal, thus requiring an additional stage of amplification between the video detector and the control grid of the sync separator. To drive the noise triode in the Kroger circuit into saturation, in order to carry the current flow necessary for the proper operation of the sync separator, a detected signal several times that commonly available must be provided. Furthermore, the range of voltage necessary to drive the noise triode from cut-off to saturation should be as small as possible in order to cut-off the sync separator sharply for adequate noise suppression. Unfortunately, electron discharge vacuum tubes which can be driven from cut-off to saturation with a small change in the input voltage, as one volt or so, cannot carry the required current flow for the synchronizing signal separator.

Another known circuit for noise cut-off of a sync separator is shown by Kramer 3,109,061. The Kramer circuit provides a transistor noise gate which forms a sole electron return path for the cathode of a triode sync separator. When a signal impulse which exceeds the fixed gate level drives the transistor into nonconduction, the return to ground path for the cathode of the triode sync separtor should be open circuited to disable the triode. Unfortunately, across the open circuit resistance of the nonconducting transistor there exists a capacitance of considerable magnitude, which may be of the order of twenty or thirty micromicrofarads to ground. This capacitance is the combined result of the heater-to-cathode capacitance of the triode, the collector-to-ground capacitance of the transistor, and the various wiring capacitances to ground. The time constant of this circuit prevents the sync separator from being disabled soon enough to prevent high frequency noise, of the order of sixty kilocycles and above, from being passed to the output.

The Kramer circuit also uses a fixed gating level for the noise gating transistor, allowing an undersirable "lock-out" condition to occur. For example, when the horizontal oscillator in a television receiver breaks from synchronization, the AGC potential from commonly employed keyed AGC type circuits changes in a direction which causes the IF stages of the receiver to operate at maximum amplification. The detected video information therefore increases in magnitude, and may exceed the fixed gating level of the noise gate. As a result, the noise gate disables the sync separator, preventing the horizontal oscillator from becoming again synchronized.

According to the applicant's invention, an improved noise cut-off circuit for a synchronizing signal separator is provided which overcomes the disadvantages of known prior circuits, such as those illustratively described above.

One object of this invention is to provide an improved noise cut-off circuit for a synchronizing signal separator in a television receiver.

Another object of this invention is to provide a noise cut-off circuit using a transistor, which is effective to disable a synchronizing signal separator in the presence of high frequency noise, and which remains operative although the detected composite television signal fluctuates over a substantial range of amplitudes.

One feature of this invention is the provision of a transistor noise gating circuit which allows a sync separator to separate only the synchronizing components of a received composite video signal, and which is further operative to cut-off the sync separator rapidly in the presence of high frequency noise.

Another feature of this invention is the provision of a transistor noise gate which shunts a finite impedance in the cathode circuit of a synchronizing signal separator. The base of the transistor is coupled through an impedance element to an intermediate grid of a video amplifier, for developing a gating level which varies in proportion to the detected signal on the control grid of the video amplifier. A second impedance element further couples the base of the transistor to the control grid of the video amplifier for operatively connecting the transistor to the received composite signal.

Figure 2:
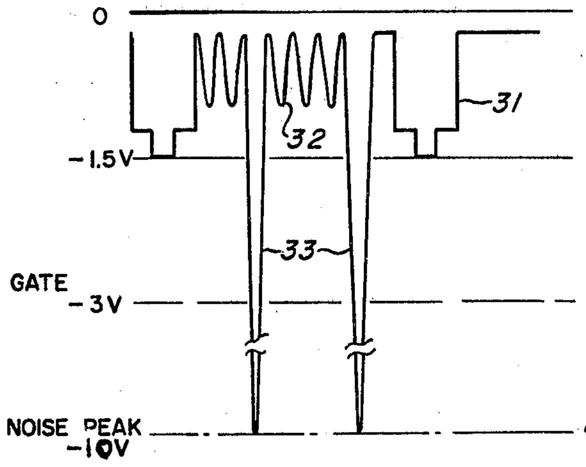

Further features and advantages of the invention will be apparent from the following specification, and from the drawings, in which:

FIGURE 1 is a diagram, partly block and partly schematic, of an embodiment of the invention; and FIGURE 2 is a waveform diagram of the detected composite video signal at the video detector illustrated in FIGURE 1.

While an illustrative embodiment of the invention is shown in the drawing and will be described in detail herein, the invention is susceptible of embodiment in several different forms and it should be understood that the present disclosure is to be considered as an exemplification of the principles of the invention and is not intended to limit the invention to the embodiment illustrated. Throughout the specification, values and type designations will be given for the components in order to disclose a complete, operative embodiment of the invention. However, it should be understood that such values and types are merely representative and are not critical unless specifically so stated. The scope of the invention will be pointed out in the appended claims.

Turning now to FIGURE 1, a portion of a television signal receiver, for either black and white or color reception, is illustrated. A composite television signal, which is received on an antenna 10, is coupled to an RF stage 11 which typically includes an RF amplified and an oscillator-mixer for converting the received signal into a signal of intermediate frequency. The IF signal is amplified by a signal translating IF stage 12 and coupled to a second signal translating stage formed from a video detector 13 and a video amplifier 14. The output of video amplifier 14 is coupled to a picture reproducer (not illustrated), as a cathode ray tube.

A sound pick-up circuit 16 is coupled to the output of video amplifier 14 for supplying the audio information component of the detected composite video signal to the sound reproducing stages (not illustrated) of the television received. A portion of the amplified composite video signal is coupled to a synchronizing signal separator 17, the output of which is coupled to the horizontal and vertical scanning stages (not illustrated) of the receiver for synchronizing purposes. The various circuits which have not been illustrated or are shown in block diagram form are conventional, and further description is not deemed necessary for a proper understanding of the present invention.

Video detector 13 is a semiconductor diode 20 whose anode is DC coupled to video amplifier 14 through an inductor 21 and a 330 ohm resistor 22. A capacitor 23 is coupled between the junction of diode 20 and inductor 13, and a reference potential or ground 24. The junction 26 between inductor 21 and resistor 22 is coupled to ground 24 through a capacitor 27 in parallel with a series connected 3.9 kilohm resistor 28 and an inductor 29.

The detected negative going composite video signal available at junction 26 is illustrated in FIGURE 2. The composite television signal includes a synchronizing signal component 31 and a video information component 32. The peak magnitude of the synchronizing component 31, available at junction 26, may be on the order of minus 1.5 volts. In addition, undesirable noise impulses 33, often having a peak magnitude which greatly exceeds the magnitude of the synchronizing component 31, as for example minus 10 volts, may accompany the detected composite signal.

Returning to FIGURE 1, the composite signal at junction 26 is DC coupled through resistor 22 to the control grid 36 of video amplifier 14, utilizing the pentode section of an 11KV8. The cathode 37 of amplifier 14 is directly connected to ground 24. The second or screen grid 38 of the amplifier is connected througth a 22 kilohm resistor 40 to a low voltage power supply (B+) of the order of 140 volts. The plate 42 of video amplifier 14 is connected with a load including sound take-off circuit 16 and a paralleled resistor 44 and inductor 45 connected to B+ through an inductor 52 and a 7600 ohm resistor 53.

In order to separate the synchronizing components 31 from the remainder of the video information, the amplified signal at plate 42 of amplifier 14 is coupled to synchronizing signal separator 17, the triode section of a 6KZ8. A control grid element 55 of the triode is coupled through a paralleled 270 kilohm resistor 56 and 470 micromicrofarad capacitor 57, and a series connected .0033 microfarad capacitor 58 and a resistor 59, to the junction between inductor 52 and resistor 53. A 3.3 megohm grid leak resistor 60 is connected between control grid 55 and ground 24.

If the cathode element 62 of the triode is coupled through a low impedance path to ground 24, it provides a reference and the positive going composite signal on grid 55 will produce a negative going sync signal across a load resistor 63 connected between plate element 64 and B+. This path is formed from an NPN transistor 66, connected as illustrated in FIGURE 1, which also acts to disable separator 17 in the presence of noise impulses. Transistor 66, for example, may be a Fairchild type 8002 planar transistor.

The emitter electrode 67 of transistor 66 is directly connected to ground 24. The collector electrode 68 of the transistor is directly connected to the cathode 62 of triode 17, and to a voltage divider network 70 formed from a 82 kilohm resistor 71 and a 39 kilohm resistor 72 connected in series between B+ and ground 24.

The base electrode 74 of the transistor is coupled to the detected composite signal at junction 26 by a 22 kilohm resistor 75. In addition, base 74 is coupled through a 330 kilohm resistor 76 to a source of DC potential whose magnitude varies in proportion to the signal strength of the received composite television signal. Such a source is readily available at the screen grid 38 of video amplifier 14 when bypassed to ground by a large capacitor 77, as two microfarads. That is, the detected composite signal on control grid 36 is inverted and amplified two or three times by the screen grid-control grid amplification factor, producing a signal that is proportional to the DC average of the signal at detector 20. For the composite signal illustrated is FIGURE 2, the average signal at the junction of capacitor 77 and resistor 76 is typically positive 70 volts.

The resistor 76 is of a value which causes the positive average signal coupled to base 74 of the transistor to be greater than the negative going signal coupled through resistor 75. The resulting positive signal forward biases the emitter-base junction of the transistor, driving the transistor into saturation. As a result, a low impedance path, on the order of several ohms, is formed between the collector and emitter of the transistor, shunting resistor 72 of voltage divider 70. The normally conducting transistor thus connects cathode 62 of the sync separator to a low potential substantially equal to the potential of ground 24.

When a large magnitude noise impulse 33 is received, the resulting large negative going signal coupled through resistor 75 overrides the positive signal from resistor 76, driving base 74 negative relative to ground 24. This back biases transistor 66, quickly driving the transistor into its nonconducting state.

When transistor 66 is nonconductive, an appreciable capacitance from cathode 62 to ground 24 is formed from the various interelectrode capacitances of triode 17 and transistor 66, and stray wiring capacitance. The DC voltage available at the junction of voltage divided 70 quickly charges this capacitance to ground. As a result, the illustrated circuit has a short time constant, and the cathode 62 of the synchronizing separator is quickly disconnected from ground 24 even in the presence of high frequency noise pulses. When cathode 62 of triode 17 is disconnected from ground, the synchronizing signal separator is disabled, thus preventing the noise pulse from being separated to produce a false sync output at plate 64.

Since the gate level at base 74, formed from the DC signal coupled through resistor 76, varies in proportion to the received signal strength, a lock-out condition is prevented from occurring. That is, if the negative composite signal from the video detector 13 increases significantly in amplitude, the positive signal developed at the second grid 38 of video amplifier 14 also increases in amplitude, preventing the noise gating transistor 66 from being cut-off merely in the presence of a composite signal of greater strength.

Resistors 75 and 76 may be adjusted for different values of components and power supply potentials. The resistances should be proportioned relative to each other to cause the junction between the resistors to be approximately at zero volts potential relative to ground 24 with a signal at junction 26 which is slightly less than the amplitude of a signal which would cut-off transistor 66. For the typical received composite signal illustrated in FIGURE 2, a minus 1.5 volt signal could be impressed at junction 26. However, it is desirable to set the gating level at a magnitude that is greater than the magniude just exceeding the peak level of the synchronizing component 31 of the received wave. This will compensate for received composite signals that have different amounts of video information relative to the fixed amplitude of the synchronizing component 31. For the specific circuit illustrated in FIGURE 1 and described above, the gate level is minus 3 volts when the peak amplitude of the synchronizing components of a received composite signal is minus 1.5 volts. Of course, as the signal strength of the detected composite signal at junction 26 varies from that shown in FIGURE 2, the gating level will automatically vary to insure that only noise impulses can cut-off transistor 66.

I claim:

1. In a television signal receiver for receiving a composite signal having video signal components and synchronizing signal components which have an amplitude greater than the amplitude of the video signal components, and which may be accompanied by noise pulses having a greater amplitude than the amplitude of said synchronizing signal components, the combination of:

signal translating means for providing a demodulated composite signal and for developing a DC signal proportional to an average value of the demodulated composite signal;

means establishing a reference potential;

synchronizing signal separator means including an electron discharge device having an output element, a reference element, and a control element;

means coupling said control element to said signal translating means, said device producing an output signal at said output element when said synchronizing signal components are present and said reference terminal is connected through a low impedance path to said reference potential;

noise gating means including a transistor having first and second electrodes with conductive and nonconductive states therebetween under control of a signal at a third electrode;

means coupling said first electrode to said reference element and said second electrode to said reference potential means;

impedance means forming a part of said gating means and coupling said DC signal and said composite signal to said transistor for driving said transistor into its conductive state when said demodulated composite signals are present and into its nonconductive state when said composite signal includes a noise pulse which exceeds the magnitude of the DC signal, said conductive transistor forming said low impedance path; and network means coupled between said first electrode and said reference potential means for providing a potential for rapidly charging interelectrode capacitance when said transistor is nonconductive to cut-off said device rapidly in the presence of high frequency noise.

2. The combination of claim 1 wherein said network means includes a source of potential and a voltage divider having a finite impedance to said reference potential, said source being connected across said divider, and said finite impedance shunting the first and second electrodes of said transistor.

3. The combination of claim 1 wherein said signal translating means including a video detector coupled to a video amplifier having a first grid and a second grid on which is developed a signal proportional to a signal on the first grid, means coupling said first grid to said video detector, said second grid developing said DC signal.

4. The combination of claim 3 including a capacitor coupled between said second grid and said source of reference potential for bypassing the AC component of the composite signal.

5. The combination of claim 3 wherein said impedance means includes first resistive means connecting said third electrode to said first grid and second resistive means connecting said third electrode to said second grid.

6. The combination of claim 3 wherein the control element of the synchronizing signal separator is coupled to a plate output electrode of said video amplifier.

References Cited

UNITED STATES PATENTS

| | | | |
|---|---|---|---|
| 2,736,769 | 2/1956 | Macovski | 178—7.3 |
| 2,880,271 | 3/1959 | Kroger | 178—7.3 |
| 3,109,061 | 10/1963 | Kramer | 178—7.3 |
| 3,256,502 | 6/1966 | Momberger | 178—7.3 |

ROBERT L. GRIFFIN, Primary Examiner

A. H. EDDLEMAN, Assistant Examiner

U.S. Cl. X.R.

178—7.3, 7.5